(12) United States Patent
Aull et al.

(10) Patent No.: US 7,475,250 B2
(45) Date of Patent: Jan. 6, 2009

(54) ASSIGNMENT OF USER CERTIFICATES/PRIVATE KEYS IN TOKEN ENABLED PUBLIC KEY INFRASTRUCTURE SYSTEM

(75) Inventors: Kenneth W. Aull, Fairfax, VA (US); Thomas C. Kerr, Fairfax, VA (US); William E. Freeman, Arbutus, MD (US); Mark A. Bellmore, Mt. Airy, MD (US)

(73) Assignee: Northrop Grumman Corporation, Los Angeles, CA (US)

( * ) Notice: Subject to any disclaimer, the term of this patent is extended or adjusted under 35 U.S.C. 154(b) by 1322 days.

(21) Appl. No.: 10/027,622

(22) Filed: Dec. 19, 2001

(65) Prior Publication Data

US 2003/0115468 A1 Jun. 19, 2003

(51) Int. Cl.
*H04L 9/00* (2006.01)

(52) U.S. Cl. .................................... 713/173
(58) Field of Classification Search ................ 713/159, 713/172–173; 380/258
See application file for complete search history.

(56) References Cited

U.S. PATENT DOCUMENTS

| | | | | |
|---|---|---|---|---|
| 5,671,279 A * | 9/1997 | Elgamal | ..................... | 705/79 |
| 5,721,781 A * | 2/1998 | Deo et al. | ..................... | 705/67 |
| 5,943,423 A * | 8/1999 | Muftic | ..................... | 705/67 |
| 5,970,147 A | 10/1999 | Davis | | |
| 6,003,014 A * | 12/1999 | Lee et al. | ..................... | 705/13 |
| 6,192,131 B1 * | 2/2001 | Geer et al. | ..................... | 380/283 |
| 6,460,138 B1 * | 10/2002 | Morris | ..................... | 713/184 |
| 6,615,171 B1 * | 9/2003 | Kanevsky et al. | ..................... | 704/246 |
| 2001/0002485 A1 * | 5/2001 | Bisbee et al. | ..................... | 713/167 |
| 2002/0026578 A1 * | 2/2002 | Hamann et al. | ..................... | 713/159 |
| 2003/0005291 A1 * | 1/2003 | Burn | ..................... | 713/159 |

FOREIGN PATENT DOCUMENTS

| WO | WO 99/19846 | 4/1999 |
|---|---|---|
| WO | WO 01/61620 A | 8/2001 |

OTHER PUBLICATIONS

Housley et al., "Internet X.509 Public Key Infrastructure Certificate and CRL Profile", Request for Comments: 2459, Jan. 1999, pp. 1-113.
"Installation and User Guide Version 3.2", Gemsafe Libraries for Windows, 'Online!, Jul. 31, 2002, XP002250119 Retrieved from the Internet: URL:www.study24.org/pdf/software/gemsafelib-user.pdf 'retrieved on Aug. 1, 2003! pp. 23-27.

* cited by examiner

*Primary Examiner*—Matthew B Smithers
*Assistant Examiner*—Nadia Khoshnoodi
(74) *Attorney, Agent, or Firm*—Tarolli, Sundheim, Covell & Tummino LLP

(57) ABSTRACT

A method and computer program to assign certificates/private keys to a token. This method and computer program allows a user to access a certificate authority and have certificates/private keys that are used for signature, encryption and role purposes generated and downloaded to the token. The use of secure communication lines and computers is not necessary since the token contains a unique token ID and private key, while the certificate authority contains the associated public key for the token. The certificate generated is wrapped in the public key and only the token, having the associated private key, may activate the certificate.

16 Claims, 4 Drawing Sheets

ASSIGNMENT OF USER CERTIFICATES/PRIVATE KEYS IN TOKEN ENABLED PUBLIC KEY INFRASTRUCTURE SYSTEM

BACKGROUND OF THE INVENTION

1. Field of the Invention

This invention relates generally to a method of assignment of user certificates/private keys in a token enabled public key infrastructure (PKI) system and, more particularly, to a method and computer program for creation, transmission, assignment and management of encryption, signature and role certificates/private keys in a token enabled PKI system.

2. Discussion of the Related Art

For centuries individuals, governments, and business entities have searched for mechanisms and techniques whereby sensitive information may be transmitted to authorized parties over long distances and still remain secure. The problem faced by the foregoing entities is how can information be sent to the individual or entities that require it and still be assured that unauthorized parties may not be able to comprehend the transmitted information should they intercept it. Early methods of securing information have employed scrambling techniques, lookup tables, substitution ciphers, and code books in which letters or terms would be substituted for the original letters and terms in the information. These techniques frequently required that both the sender and receiver of information have access to the same "code book." One danger in such a technique is that the code book would fall into unauthorized hands.

In the early twentieth century, and in particular during World War II, code books were replaced by electromechanical cipher machines. Both the sender and receiver would have an identical cipher machine used to encrypt and decrypt messages sent. In order to make it more difficult to decrypt these messages the cipher machines have the ability to change the cipher used in a message or change the cipher used for every few words within a message. In order to accomplish this the cipher machine would need to know the initial state or key utilized to encrypt the message.

In recent years cipher machines have been replaced by digital encryption algorithms in which both the sender and receiver have an identical copy of the digital encryption algorithm and a common key used to encrypt and decrypt messages. Both the encryption algorithm and key are held secret by both the sender and receiver.

More recently another encryption technique has been developed in which two separate keys are used for encryption and decryption. A public key is transmitted freely to whoever requires it and is used to encrypt messages for a particular receiver. The receiver would have an associated private key which may be used to decrypt the message encrypted with the associated public key. For each public key there is only one private key and for each private key there is only one public key. When sending a message to several recipients it is necessary to have each recipient's public key. The message would then be separately encrypted using each recipient's public key and transmitted to that particular recipient. Therefore, if ten separate entities are to receive the same message, ten separate messages would be transmitted with each message encrypted with individual's public key. With the advent of the Internet, such a public key infrastructure has gained significant acceptance as discussed in request for comments number 2459, by Housley et al., entitled "Internet X.509 Public Key Infrastructure", herein incorporated in its entirety by reference.

In addition to the need for the encryption and decryption of messages, with the advent of electronic mail and the Internet a need has developed for a secure mechanism to indicate approval and acceptance by an individual. In the past an individual would typically show his approval or acceptance of such items as a contract or an order via a handwritten signature, a stamp, or a seal which would only be held by that individual. Anyone else that attempted to imitate such a signature, stamp, or seal would be subject to criminal penalties. With the advent of electronic mail and the Internet, a need has arisen to take advantage of the ease and speed of electronic mail to indicate, by a person or entity with proper authority, approval or acceptance of a contract or purchase. This has come to be known as a digital signature in which an individual may digitally sign a document.

This digital signature capability has been implemented using the same public key infrastructure previously discussed. However, instead of an entire document being encrypted, the document itself is passed through a one-way hashing algorithm that produces a small document, referred to as a digest. This digest is then encrypted using the individual's private key, also known as a private signing key, and is appended to the document. The receiver of the document can verify the authenticity of the digital signature (digest) by stripping the signature from the document and recomputing the hash function on the document to generate an as received digest. Using a public signing key, included in the document or previously received, it is possible to decrypt the digest of the document and compare it to the digest as received. If the two digest match, then the signature is authenticated. Therefore, using the aforementioned public key infrastructure it is possible to both encrypt and decrypt messages as well as digitally sign documents.

However, in the aforementioned public key infrastructure, several limitations exist. One such limitation is in order for a group of individuals or entities to transmit and receive the encrypted messages each individual must have created a key pair having a public key and a private key. Further, each individual or entity in a group is also required to have a separate public signing key and a private signing key in order to digitally sign documents. In order for other members of the group to be able to decrypt messages received it is necessary for members of the group to exchange key pairs including the private key. This may be necessary when a member of the group is not in the office due to illness or travel. Where such an exchange of key pairs does not take place, when an urgent encrypted message comes into, for example, the office of finance, human resources, or an engineering group in the corporation, only the person holding the private key may decrypt the message. When that person is unavailable, that message will not be decrypted and a prompt response will not be received by the sender. However, when key pairs are exchanged by members of a group, then all members who possess an individuals private key may decrypt all messages sent to that person, regardless of the nature the message or its sensitivity. This creates significant problems for businesses that need to respond quickly to customer requests and in which customer confidences must be maintained. This may most acutely be seen in law offices, medical offices and the military where delay in delivering a response may be very costly. Further, it is cumbersome for a large group of individuals or entities to exchange key pairs with one another. For example, where group contains 30 individuals, a total of 30 times 30, or 900 exchanges of key pairs must take place in order for anyone in the group to be able to decrypt any message received by any other member of the group.

Another limitation that exists deals with security and portability of certificates/private keys. Typically, certificates/private keys assigned to users have both private and public keys with each stored on a computer. These certificates/private keys are often limited to usage in those computer systems in which they are stored. Therefore, if a user desires to use another computer system he must move his certificates/private keys to that system. Further, personal computers connected to the Internet have proven to be vulnerable to infiltration and damage by unauthorized parties. Therefore, if private and public encryption and signature certificates/private keys are stored on a personal computer which is directly or indirectly connected to the Internet, it is possible to copy the certificates/private keys and with some effort to determine the passphrase required to use the certificates/private keys.

Still another limitation to these certificates/private keys is that generating a new certificate/private key may either only be done by a security officer where high security is desired or done at a remote computer and downloaded to the user's computer with a password providing security. The use of a security officer is expensive and time consuming since the employee must setup an appointment, meet the officer, confirm his identity and then receive the certificate/private key. The downloading of a certificate/private key with only password security is risky particularly when a type of program known as a Trojan horse is used. This "Trojan horse" may intercept or access the certificates/private keys stored on the computer system for transmission to an unauthorized party.

A further limitation exists with the methods used to securely transport certificates/private keys to a User. In the typical PKI architectures, a unique X.509 private key and key encipherment certificate is issued to each server platform. This is used to create a Secure Socket Layer (SSL) session between the server platform and the client platform, so that all data transferred between these two platforms are encrypted and secure. However, a major security limitation exists because the so called last "6 inches" of the data path is not encrypted or secure; i.e., storage of the private key may be done while the key is in plain text and not yet re-encrypted.

Therefore, the client platform is a major point of vulnerability. Malicious code, such as viruses or Trojan horses, running surreptitiously on the Client Platform, could corrupt, replace, or intercept data being transferred between a server platform and the destination storage medium.

Therefore, what is needed is a method and computer program in which certificates/private keys of all types may be created, transmitted and stored in a secure manner. This method and computer program should not require a security officer or other person to provide security for the verification of the user's identity or the creation or downloading of any certificates/private keys. Further, this method and computer program should be secure against viruses or "Trojan horse" type viruses that may be present on the computer system being accessed by the user.

SUMMARY OF THE INVENTION

In accordance with the teachings of the present invention, a method and computer program is disclosed in which certificates/private keys may be generated, wrapped in a public key and transmitted to a token which may activate the certificates using a private key that only the token contains.

Further in accordance with the present invention, a method and computer program for assigning certificates/private keys to a token is disclosed. This method and computer begins by accessing the token through a token reader connected to a computer system by a certificate authority. It then reads a token ID and a user signature certificate from the token. A search is conducted for a match for the token ID and the signature certificate in an authoritative database. A certificate/private key is created in which the certificate is wrapped with a public key associated with the token ID and digitally signed by the certificate authority using a signature certificate of the certificate authority. The certificate/private key is downloaded to the token. Then the certificate/private key is decrypted using a private key stored in the token.

Additional objects, features and advantages of the present invention will become apparent from the following description and the appended claims when taken in connection with the accompanying drawings.

DETAILED DESCRIPTION OF THE PREFERRED EMBODIMENTS

Figure 1:
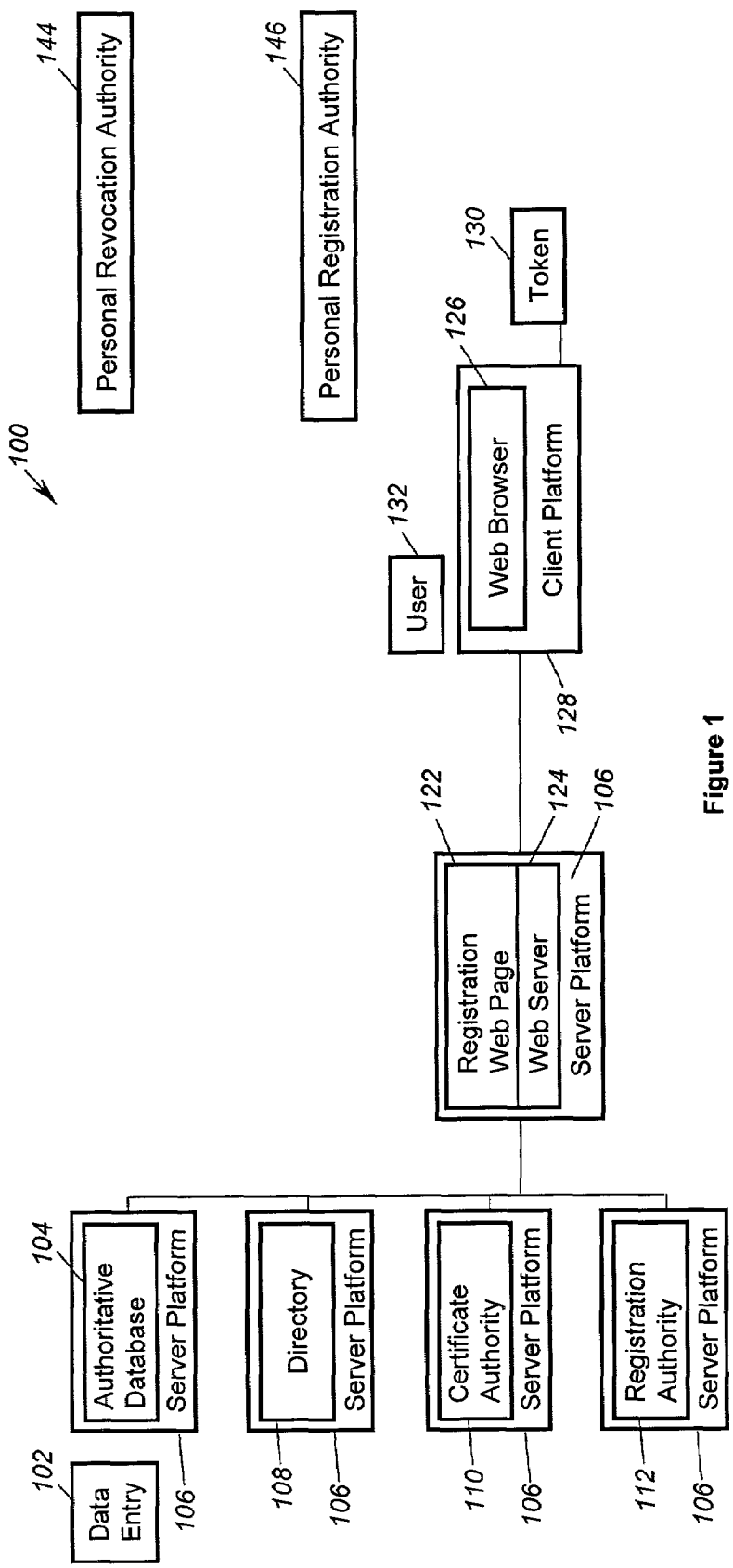
FIG. 1 is a module configuration diagram of the software, firmware, and hardware used in the embodiments of the present invention.

The following discussion of the example embodiments directed to a process for revocation and updating of token are merely exemplary in nature, and is in no way intended to limit the invention or its applications or uses.

Before beginning a detailed description of the subject invention, mention of the following is in order. When appropriate, like reference numerals and characters may be used to designate identical, corresponding or similar components in differing figure drawings. Further, in the detailed description to follow, exemplary sizes/models/values/ranges may be given, although the present invention is not limited to the same.

Before entering into a discussion of the flowcharts a brief discussion of the nature and function and structure of a role certificate is necessary. As will become apparent from review of FIGS. 2 through 4, the embodiments of the present invention are based on an X.509 certificate (V3) discussed in detail in item 4 of RFC 2459, previously incorporated herein by reference. The X.509 certificate is a public key certificate utilized for either encryption purposes or as a signature key. The information contained in the X.509 certificate will vary according to whether it is set up as a signature certificate or as a public key for encryption. The role certificate contains at least those fields shown in Table 1 ahead.

TABLE 1

| X.509 (V3) Certificate |
| --- |
| version (V3) |
| serial number |
| signature algorithm ID |
| Issuer name |
| validity period |
| subject name |

TABLE 1-continued

X.509 (V3) Certificate subject public key information
Issuer unique identifier
subject unique identifier
Extensions A role certificate is distinguished from an X.509 certificate (V3) in three ways. First, the name of the role certificate may distinguish it as a role certificate. Second, bits in the extension field, illustrated in table 1, would be set to indicate that the role certificate may be used for both encryption and signature purposes. Third, policies may be associated with a role certificate to indicate limitations on the uses of the role certificate. These policies may be stored on the registration web server 124 accessible by user 132, shown in FIG. 1, who receives a signature certificate associated with an office. For example, a role certificate may be issued by the office of finance within the corporation to approve a purchase request. However, since several individuals within the office of finance may issue such a role certificate as a signature, that role certificate may have a dollar limitation policy associated with it, such as not valid for more than $100,000, for which the role certificate is valid. Anything above the dollar limitation would require the individual signature certificate of the chief financial officer in order be considered valid. Other limitations may be associated for a role certificate on an individual basis. Therefore, a role certificate may be distinguished from a X.509 (v3) certificate by any one or combination of the naming conventions used for the role certificate, policies associated with the role certificate that limit its use, the ability to use the role certificate for both encryption and as a digital signature by setting bits in the extensions, as well as its use by a group of individuals for encryption, decryption, and as a group signature.

FIG. 1 is a modular configuration diagram of the software, firmware, and hardware used in the embodiments of the present invention. The blocks illustrated in FIG. 1 represent modules, code, code segments, commands, firmware, hardware, instructions and data that are executable by a processor-based system(s) and may be written in a programming language, such as, but not limited, to C++. It should be noted that the modules depicted in FIG. 1 are shown as contained in separate server platforms. However, these modules are not limited to residing on separate servers and may reside and execute one computer or any number of computers depending on the number of users the system must handle and the communications involved. FIGS. 2 through 5 are flowcharts and modular configuration diagrams further detailing the operations executed by the modules shown in FIG. 1.

FIG. 1 illustrates an exemplary architecture 100 in which the Public Key Infrastructure (PKI) processes of the present invention may be practiced. However, as previously discussed, it should be understood that the present invention is not limited to the architecture 100 of FIG. 1. The Architecture 100 includes Data Entry 102 which performs a Data Entry function for Authoritative Database 104 which is resident on the server platform 106. A server platform 106 is referred to in this description but it should be understood that the present invention is not limited to any particular server architecture. The server platform 106 maybe without limitation UNIX or Windows NT servers. The authoritative database 104 contains information about members of the group or enterprise for which PKI services in accordance with the present invention are performed. The present invention is not limited by the structure of the group enterprise for which information is stored in the authoritative database 104. The authoritative database 104 information includes, without limitation, the name, address, telephone numbers, manager's name, employee identification etc., of the members of the group or enterprise. Directory 108 has the structure of the database but is optimized for fast look-up of information stored therein rather than fast data entry. The data in the Directory 108 is not changed frequently but is required to be "accessed rapidly and functions on-line as a fast phone book" containing reference information about the members of the group or enterprise stored in the authoritative database 104. Certificate authority 110 is a conventional off-the shelf software executed on server platform 106 providing storage of certificates/private keys and related information used by the present invention as described in more detail hereinafter. Registration authority 112 is also off-the shelf software executable on server platform 106 regarding registration performed by the present invention as described in more detail hereinafter. Registration web page 122, which maybe one or more pages, functions as the user interface to the architecture 100 of FIG. 1, Web Server 124 is a software application which serves Web Pages such as Web Page 122 or other HTML outputs to a web browser client which may be without limitation Apache or a Microsoft Internet Information Server. Web browser 126 is resident on client platform 128 which may be any user computer. Web browser 126 is a client software application for browsing web pages such as but not limited to HTML or XML protocols or other protocols. The Web browser 126 is programmed to operate with PKI certificates/private keys issued by the certificate authority 110. Examples of web browsers which has this capability are Netscape Navigator and the Microsoft Internet Explorer. The token 130 is a smart card, or other hardware token capable of generating, storing and using PKI certificates/private keys. A user 132 is a person using the architecture 100. A user 132 transitions through a number of states which include a new user, current user and a former user who no longer is a member of the group or enterprise. Personal revocation authority 144 is a person who is in charge of revocation of members from the network 100. Personal registration authority 146 is a person who is in charge of registration of members in the network 100.

Still referring to FIG. 1, as previously discussed, a limitation exists with the prior methods used to securely transport private keys for the User 132 between his Token 130 and the Server Platform 106 of the Certificate Authority 110. In the typical PKI architectures, a unique X.509 private key and key encipherment certificate is issued to each Server Platform 106. This is used to create a Secure Socket Layer (SSL) session between the Server Platform 106 and the Client Platform 128, so that all data transferred between these two platforms are encrypted and secure. However, a major security limitation exists because the last "6 inches" of the data path is not encrypted or secure; i.e., the path between the Token 130 and the Client Platform 128 to which it is attached. That data are transferred typically in plain text.

Still referring to FIG. 1, the Client Platform 128 is, therefore, a major point of vulnerability. Malicious code, such as viruses or Trojan horses, running surreptitiously on the Client Platform 128, could corrupt, replace, or intercept data being transferred between the Server Platform 106 of the Certificate Authority 110 and the destination Token 130.

Figure 2:
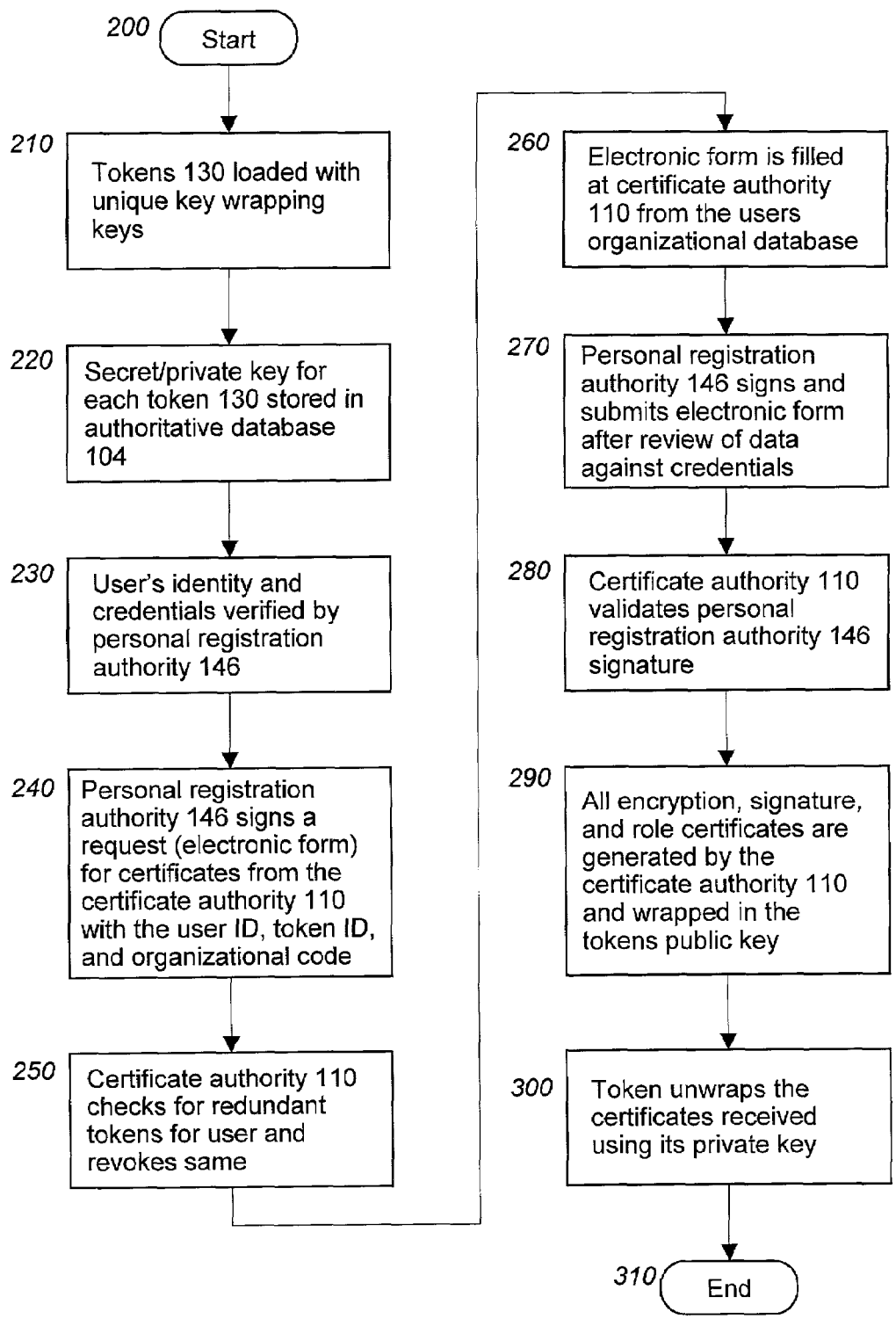
FIG. 2 is a flowchart of an example embodiment of the process for obtaining a token in the present invention.

FIG. 2 is a flowchart of an example embodiment of the process for obtaining a token 130 in the present invention. As previously discussed, a token 130 may be, but not limited to, a smart card or other device capable of storing and utilizing PM certificates/private keys. Processing begins in operation 200 and immediately proceeds operation 210. In operation 210, token 130 is loaded with a unique key used for wrapping certificates/private keys which may comprise public and private keys as well as encryption certificates/private keys, signature certificates, and role certificates. This wrapping of certificates/private keys serves the function of encrypting and thereby protecting all items contained within the token 130 from individuals who do not have the associated passphrase. Processing then proceeds to operation 220 where the secret/private key in the key pair generated in operation 210 is stored in the token 130. As will be discussed in further detail in reference to FIGS. 3 and 4, it is not necessary for a user to utilize a secure computer system to utilize and update the token 130 due to this wrapping of certificates/private keys utilizing the aforementioned wrapping key. In operation 230, the user's identity and credentials are verified by a personal registration authority 146. This personal registration authority 146 may be a badge or security officer. In operation 240, the personal registration authority 146 signs a request, which is an electronic form, comprising the users identification, token identification and organizational code. The token identification is embedded in each token during the manufacturing process and is a unique identifier. This information is transmitted to the certificate authority 110. In operation 250, the certificate authority 110 checks for redundant tokens 130 assigned to this user and revokes the same. In operation 260, the electronic form is filed with the certificate authority 110 from the users organizational database. In operation 270, the personal registration authority 146 signs and submits the electronic form after review of the data against the credentials supplied by the user 132. Processing then proceeds to operation 280 where the certificate authority 110 validates the personal registration 146 signature certificate. Operation 280 serves to verify the identity of the personal registration authority 146 and prevents tokens from being issued by unauthorized individuals. Processing then proceeds to operation 290 where all encryption, signature, and role certificates are generated by the certificate authority 110 and wrapped in the token 130 public key. This wrapping function serves to encrypt the certificates/private keys in order to prevent interception by unauthorized individuals. Thereafter, in operation 300 the token 130 may unwrap the certificates/private keys received using its private key and thereby activating the certificates/private keys. Only the token 130 having a private key that matches the public key is able to open a certificate/private key and activate them. Further, a passphrase may be required by the token 130 prior to attempting to open a certificate/private key. Processing then proceeds to operation 310 where processing terminates.

Figure 3:
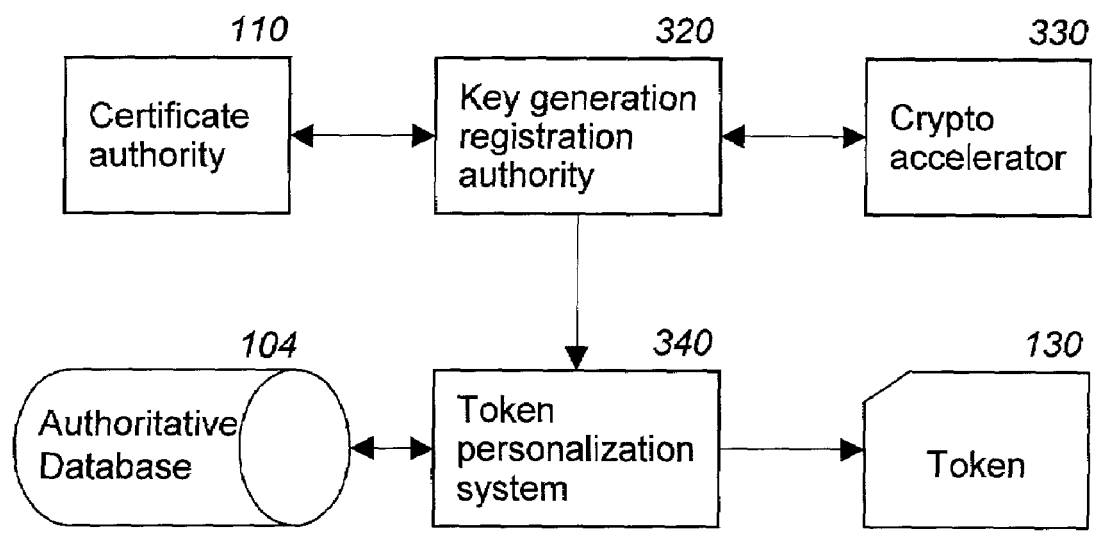
FIG. 3 is a modular diagram illustrating the process used to generate a public/private key pair used to encrypt the certificates/private keys contained in the token 130 in an example embodiment of the present invention.

FIG. 3 is a modular diagram illustrating the process used to generate a public/private key pair used to encrypt the certificates/private keys contained in the token 130 in an example embodiment of the present invention. As previously discussed in reference to FIG. 2, the certificate authority 110 would receive a request for the generation of a token 130. The certificate authority 110 would then access a key generation registration authority 320 to create the public/private Key pair required by the token 130. The key generation registration authority 320 would access a crypto accelerator 330 to generate the public/private key pair. Once the private/public key pair were generated this key pair would be transmitted to the token personalization system 340 that would create the necessary record in the authoritative database 104. This record would contain the token ID, generated by the manufacture of the token 130, the user ID, plus all encryption, signature, and role certificates/private keys that the token 130 contains. Thereafter, the private/public key would be downloaded to the token. Some time thereafter, all the certificates/private keys would be encoded using the public key stored in the authoritative database and downloaded into the token 130 in the form of a download packet.

Figure 4:
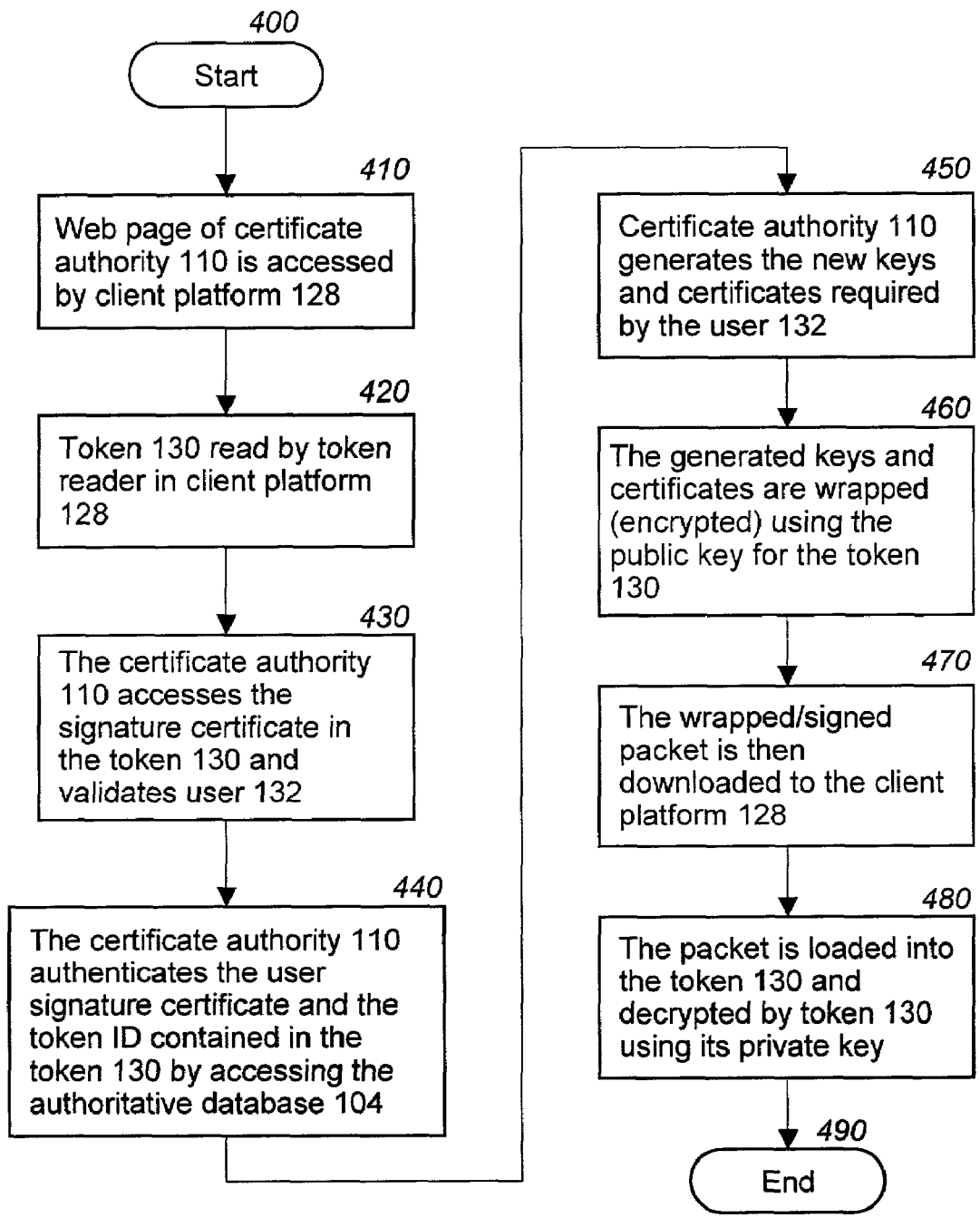
FIG. 4 is a flowchart illustrating the logic used to authenticate user 132, create a certificate, wrap/encrypt the certificate in a public key and decrypt the certificate using a private key stored in the token 130.

FIG. 4 is a flowchart illustrating the logic used to authenticate user 132, create a certificate, wrap/encrypt the certificate in a public key and decrypt the certificate/private key using a private key stored in the token 130. Processing begins in operation 400 and immediately proceeds to operation 410. In operation 410 the web page of the certificate authority 110 is accessed by user 132 utilizing client platform 128. In operation 420, the token 130 is read by a token reader in the client platform 128. Thereafter, in operation 430 the certificate authority 110 accesses the signature certificate for user 132 located in token 130 in order to authenticate user's 132 identity. In operation 440 the certificate authority 110 authenticates the user signature certificate and the token ID embedded in the token by the manufacture. Utilizing the token ID and the signature certificate the certificate authority 110 authenticates the user 132 by accessing the authoritative database 104. As previously discussed, the authoritative database 104 comprises records containing the user identification, token identifications associated with the user 132 and certificates/private keys associated with each token ID. Processing then proceeds to operation 450 where the certificate authority 110 generates any new certificates/private keys required by user 132. In operation 460, the generated keys and certificates/private keys are wrapped (encrypted) utilizing the public key retrieved from the authoritative database 104 for the token 130 based on the token ID. In addition, the certificate authority digitally signs the wrapped certificate/private key using its own signature certificate. In this manner, the user 132 can be assured that the certificate/private key the user 132 token 130 is about to receive was actually generated by the certificate authority 110. Thereafter, in operation 470 the wrapped and signed certificate/private key is then downloaded to the client platform 128. In operation 480 this certificate/private key is loaded onto token 130 and decrypted by token 130 using its private key which is stored in token 130. It should be noted that only the private key stored in token 130 may activate any certificate/private key received from the certificate authority 110. Thereafter, processing proceeds to operation 490 where processing terminates.

Using the embodiments of the present invention, a user may have certificates/private keys downloaded into a token without the use of secured computers, communication lines or security personal. This is possible using the embodiments of the present invention by recognizing that the tokens 130 are manufactured with a unique identification number assigned to them and burned into a read-only location on the token 130. The embodiments of the present invention create a unique private key and public key certificate for each token 130. The embodiments of the present invention treat the Token 130 like any other end-entity in a public key infrastructure. It has a unique identity. The embodiments of the present invention create a private key and public key certificate for it. Thus, token 130 can be the point of origination or destination of any signed and/or encrypted data communications. Before the embodiments of the present invention, data transferred from the Server Platform 106 and the Token 130 was encrypted between the Server Platform 106 and the Client Platform 128 and relayed as plain text (unencrypted) between the Client Platform 128 and the Token 130. After the embodiments of the present invention, the data are encrypted all the way from the Server Platform 106 to the Token 130. The Client Platform 128 relays encrypted data, which it cannot decrypt or unwrap. Therefore, the earlier security vulnerability does not exist.

While we have shown and described only a few examples herein, it is understood that numerous changes and modifications as known to those skilled in the art could be made to the present invention. For example, any type of computer architecture may be utilized for the embodiments of present invention. Further, the present invention may be written in any general-purpose computer language. Also, the token need not be limited to containing certificates/private keys but may also be used for passports, credit cards, drivers licenses, automated teller machine cards, or other types of cards since they would all be secured by being wrapped in the same public key as the certificates/private keys. Therefore, we do not wish to be limited to the details shown and described herein, but intend to cover all such changes and modifications as are encompassed by the scope of the appended claims.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A method for assigning certificates and associated private keys to a token, comprising:
   accessing the token through a token reader connected to a computer system by a certificate authority;
   reading a token ID and a user-signature certificate from the token;
   searching for a match for the token ID and the user signature certificate in an authoritative database;
   creating a certificate and an associated private key, wherein the certificate and the associated private key are wrapped with a public key associated with the token ID and digitally signing the certificate and the associated private key using a signature certificate of the certificate authority if a match for the token ID and the user signature certificate is found in the authoritative database;
   downloading the certificate and the associated private key to the token; and
   decrypting the certificate and the associated private key using a private key stored in the token, such that the token stores at least the token ID, the private key, the user signature certificate and the certificate and the associated private key.

2. The method recited in claim 1, wherein the certificate and the associated private key is a plurality of certificates and associated private keys wherein at least one of the plurality of certificates and associated private keys is a signature certificate for the user, an encryption certificate and associated private key for the user, and a role certificate and associated private key for the user wherein the role certificate includes at least one policy.

3. The method recited in claim 2, wherein the wrapping of the certificate and the associated private key with the public key of the token encrypts the certificate and the associated private key.

4. The method recited in claim 3, wherein the token is a smart card.

5. The method recited in claim 4, wherein the token ID is assigned by a token manufacturer at the time the token is created and stored in the authoritative database when assigned to a user.

6. The method recited in claim 5, wherein downloading the certificate and the associated private key to the token is done through an unsecured communications line.

7. The method recited in claim 6, wherein decrypting the certificate and the associated private key using the private key stored in the token requires the entry of a passphrase by a user.

8. The method recited in claim 7, further comprising:
   authenticating, by the signing of the certificate and the associated private key using a signature certificate of the certificate authority, that the certificate and the associated private key were issued by the certificate authority.

9. A computer program embodied on a computer readable medium and executable by a computer for assigning certificates and associated private keys to a token, comprising:
   accessing the token through a token reader connected to a computer system by a certificate authority;
   reading a token ID and a user signature certificate from the token;
   searching for a match for the token ID and the user signature certificate in an authoritative database;
   creating a certificate and an associated private key, wherein the certificate and the associated private key are wrapped with a public key associated with the token ID and digitally signing the certificate and the associated private key using a signature certificate of the certificate authority if a match for the token ID and the user signature certificate is found in the authoritative database;
   downloading the certificate and the associated private key to the token; and
   decrypting the certificate and the associated private key using a private key stored in the token, such that the token stores at least the token ID, the private key, the user signature certificate and the certificate and the associated private key.

10. The computer program recited in claim 9, wherein the certificate and associated private key is a plurality of certificates and associated private keys wherein at least one of the plurality of certificates and associated private keys is a signature certificate for the user, an encryption certificate and associated private key for the user, and a role certificate and associated private key for the user, wherein the role certificate includes at least one policy.

11. The computer program recited in claim 10, wherein the wrapping of the certificate with the public key of the token encrypts the certificate and the associated private key.

12. The computer program recited in claim 11, wherein the token is a smart card.

13. The computer program recited in claim 12, wherein the token ID is assigned by a token manufacturer at the time the token is created and stored in the authoritative database when assigned to a user.

14. The computer program recited in claim 13, wherein downloading the certificate and the associated private key to the token is done through an unsecured communications line.

15. The computer program recited in claim 14, wherein the decrypting the certificate and the associated private key using the private key stored in the token requires the entry of a passphrase by a user.

16. The computer program recited in claim 15, further comprising:
   authenticating by the signing the certificate and the associated private key using a signature certificate of the certificate authority that the certificate and the associated private key was issued by the certificate authority.

* * * * *